J. H. WARNER.
BROKEN SPRING REPAIRER.
APPLICATION FILED JUNE 29, 1911.
1,017,485.
Patented Feb. 13, 1912.
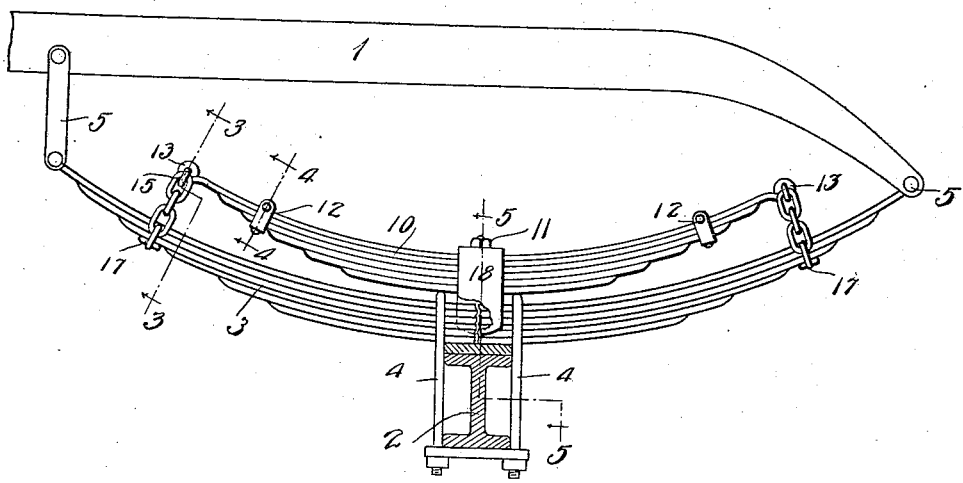
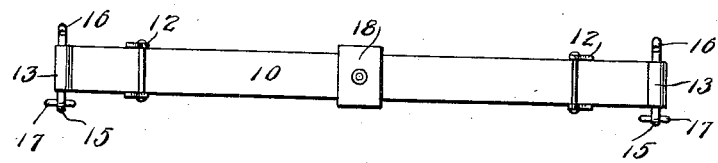
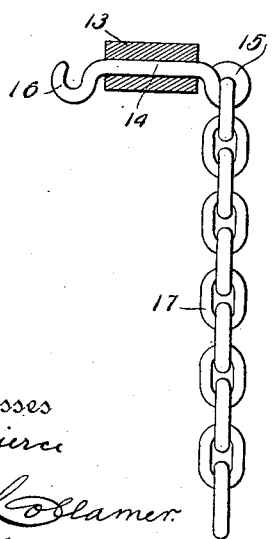
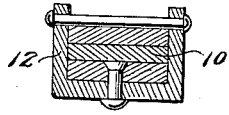
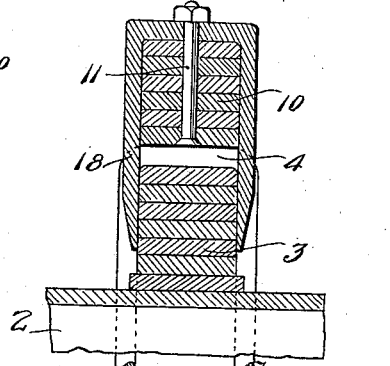
Witnesses
Inventor
J. H. Warner.

UNITED STATES PATENT OFFICE.

JOHN H. WARNER, OF MOUNT POCONO, PENNSYLVANIA.

BROKEN-SPRING REPAIRER.

1,017,485.  Specification of Letters Patent. Patented Feb. 13, 1912.

Application filed June 29, 1911. Serial No. 635,939.

*To all whom it may concern:*

Be it known that I, JOHN H. WARNER, a citizen of the United States, residing at Mount Pocono, in the county of Monroe and State of Pennsylvania, have invented certain new and useful Improvements in Broken-Spring Repairers; and I do declare the following to be a full, clear, and exact description of the invention, such as will enable others skilled in the art to which it appertains to make and use the same.

This invention relates to the class of vehicles, and more especially to the springs therein; and the object of the same is to produce a portable device by means of which a leaf or semi-elliptical spring can be repaired on the road without the necessity for using any tools but a jack. This object is accomplished by the construction hereinafter more fully described and claimed, and shown in the drawings wherein—

Figure 1 is a side elevation illustrating a broken semi-elliptical spring beneath the rear end of an automobile chassis, and the application of my repairer thereto. Fig. 2 is a plan view of the repairer; Figs. 3 and 4 are sections on the lines 3—3 and 4—4 respectively of Fig. 1; Fig. 5 is a section on the broken line 5—5 of Fig. 1.

In the drawings the numeral 1 represents a portion of the frame of a vehicle on which the body and driving mechanism are usually mounted, 2 the axle-bar or an I-bar carrying the axle bearings and 3, one of the body springs which is interposed between the bar 2 and the frame 1, in the usual manner. The spring rests upon and is secured to the bar 2 by a clip 4, and has its ends linked, pivoted or otherwise connected to the frame 1, as indicated at 5.

The arrangement of parts, as above described, is commonly employed in the design and construction of motor vehicles and serves herein merely to illustrate the application of my invention, which it will be understood, may be embodied in various other forms in order to adapt it to springs differently shaped and mounted.

From experience and observation, I have found that in the majority of instances, breaks resulting from the overstraining of body springs, occur directly above the point of support or within the clip by which the spring is secured to the axle. When thus broken the spring immediately collapses and in making a temporary repair, it is first necessary to jack up the body of the vehicle, in order to reassemble the broken sections of the spring in the clip, which serves to hold them in line. As this may be accomplished ordinarily with little or no difficulty, it is the object of my invention to secure and maintain the parts thus assembled in operative relation, by uniting the broken sections in a manner at once to restore the effectiveness of the spring without greatly decreasing its resilience. For this purpose heretofore it has been proposed to provide a bar or rod of non-resilient metal which could bridge or straddle over the break in the spring and have its extremities connected thereto by clips or other suitable means, but the fact that this bar or rod was non-resilient threw the strain upon the extremities of the already broken springs because its center was rendered stiff by the application of said bar.

Coming now more particularly to the present invention, my repairer comprises a somewhat shorter semi-elliptical spring member, with or without its own shackles, a U-shaped guide to hold it in place upon the spring, and means to connect its extremities therewith. The numeral 10 designates the several leaves of this spring which are suitably connected at an intermediate point throughout their length by such means as a bolt 11; 12, 12 are the shackles with which this supplemental or emergency spring is provided (although these are not absolutely necessary), 13, 13 are eyes in the ends of its longest leaf, 14 is a rod through each eye having its own eye 15 at one extremity and a hook 16 at the other, and 17 is a short section of chain having one extremity linked into the eye 15 and the other extremity free as shown.

The numeral 18 designates a guide of inverted U-shape whose center stands over the center of the spring and is preferably engaged beneath the nut or head of the bolt 11, and whose arms pass down beside the leaves of said spring and project some distance below it as best seen in Fig. 5.

This repairer is applied in the manner best illustrated in Fig. 1 by passing its body wholly into the space between the spring 3 and the frame 1 above it, then letting it down until the extremities of the arms of the guide 18 stand astride the spring 3 as shown, and then drawing each chain 17 closely around the broken spring and engaging one of its links with the hook 16 in its own rod 14 in a manner which will be clear. It will obviously be necessary first to jack up the frame 1 at this corner of the vehicle so as to take all strain off the broken spring, and this act will open up the space into which the repairer is to be inserted. After inserting it in place and drawing the chains as tightly as may be, the jack can be removed and the weight let down onto this corner of the chassis frame, when the repairer will bridge the break and the emergency spring will itself yieldingly sustain the load until the driver reaches home and can make his repairs permanent.

My improved emergency spring is by preference made of several leaves, and I have shown quite a number in the drawings; but it is possible to make it of a single leaf if it is sufficiently strong to bear the load likely to be thrown upon it, although if but a single leaf be used the shackles 12 will not be necessary. The leaf or leaves should be well tempered, in width they should be about the same as the width of the main spring 3, in length they must be somewhat less for obvious reasons, and their curvature should also be somewhat greater than that of the elliptical or semi-elliptical spring within which they are to be used.

The details are susceptible of some modification without departing from the principle of my invention.

What is claimed as new is:

1. The herein described emergency repairer for vehicle springs consisting of a flat spring of less length than the one to be repaired and having eyes in its extremities, a rod passing transversely through each of said eyes and having itself an eye in one end and a hook in the other, a section of chain having one end link engaging said eye in the rod and of a length sufficient to permit it to pass around the broken spring and engage the hook, and means for temporarily holding the emergency spring upon the center of the other spring.

2. The herein described emergency repairer for vehicle springs consisting of a leaf spring of equal width with but of less length than the spring to be repaired and having eyes in its extremities, a rod passing transversely through each of said eyes and having an eye in one end and a hook in the other, a section of chain having one end link engaging said eye in the rod and of a length sufficient to permit it to pass around the broken spring and engage the hook, an inverted U-shaped guide whose center passes over the center of the emergency spring and whose arms extend down past its edges and are adapted to straddle the edges of the broken spring, and a bolt securing said guide upon the emergency spring.

In testimony whereof I have hereunto set my hand in presence of two subscribing witnesses.

JOHN H. WARNER.

Witnesses:
WILLIAM L. ANDRE,
SAMUEL B. CORRELL.

Copies of this patent may be obtained for five cents each, by addressing the "Commissioner of Patents, Washington, D. C."